United States Patent
Khan et al.

(10) Patent No.: US 6,421,201 B1
(45) Date of Patent: Jul. 16, 2002

(54) OUTCAST AND REDUCTION OF LUBRICANTS FROM SPINDLE MOTOR BY UTILIZING A CONDENSATION SEAL

(76) Inventors: Raquib Uddin Khan, 3703 Reflections Dr., Pleasanton, CA (US) 94566; Matt Loren Shumway, 1014 Yarwood Ct., San Jose, CA (US) 95128; Susan Feng Fan, 2549 Dell Ave., Santa Clara, CA (US) 94043

( * ) Notice: Subject to any disclaimer, the term of this patent is extended or adjusted under 35 U.S.C. 154(b) by 0 days.

(21) Appl. No.: 09/705,555

(22) Filed: Nov. 2, 2000

Related U.S. Application Data
(60) Provisional application No. 60/164,168, filed on Nov. 9, 1999.

(51) Int. Cl.$^7$ .............................................. G11B 17/02
(52) U.S. Cl. .................................. 360/97.02; 360/99.08
(58) Field of Search ........................... 360/97.02, 97.03, 360/99.04, 99.08

(56) References Cited

U.S. PATENT DOCUMENTS

| | | | |
|---|---|---|---|
| 5,011,165 A | | 4/1991 | Cap |
| 5,617,272 A | * | 4/1997 | MacLeod et al. ........ 360/99.08 |
| 5,739,980 A | * | 4/1998 | Brooks .................... 360/99.08 |
| 5,751,084 A | | 5/1998 | Park |
| 5,841,607 A | | 11/1998 | Khan et al. |
| 5,880,543 A | | 3/1999 | Park |

\* cited by examiner

*Primary Examiner*—Robert S. Tupper
(74) *Attorney, Agent, or Firm*—Moser Patterson & Sheridan LLP

(57) ABSTRACT

A disc drive spindle motor includes a fixed member coupled to the chassis, and a rotor rotatable about the fixed member for rotating a magnetic storage disc in the contaminant free cavity. A bearing, which may be a hydrodynamic bearing, ball bearing or other bearing type, interconnects the fixed member and the rotor, and supports the rotor for rotation relative to the fixed member. A simple condensation seal is supported from either the fixed member or the rotor, adjacent the bearing opening where outgassing may occur. The seal incorporates a cooling surface which is supported from either the hub/rotor or the fixed member adjacent the region where outgassing occurs; the surface preferably should be wavy, or fin shaped to provide a maximum surface area for better heat transfer and better cooling effect, so that the surface is relatively cooler than the surrounding operating environment. The surface is shaped and made of a material, e.g. aluminum, and of a thickness to optimize the heat transfer characteristics, so that the hot volatile products of the outgassing phenomenon will condense when they come in contact with the condensation seal surface.

15 Claims, 4 Drawing Sheets

OUTCAST AND REDUCTION OF LUBRICANTS FROM SPINDLE MOTOR BY UTILIZING A CONDENSATION SEAL

CROSS-REFERENCE TO A RELATED APPLICATION

This application is based on U.S. Provisional Patent Application Serial No. 60/164,168 filed on Nov. 9, 1999, entitled "Outgassing Reduction Of Lubricants (Oils and Greases) From Disk Drive Spindle Motor By Having A 'Condensation Seal'", invented by Raquib U. Khan and Matt L. Shumway. The priority of this provisional application is hereby claimed and is incorporated herein by reference.

FIELD OF THE INVENTION

This invention relates generally to the field of disc drive data storage devices. More specifically, the invention relates to an improved seal based on condensation phenomenon for use with a disc drive spindle motor to reduce or prevent outgassing from the spindle motor.

BACKGROUND OF THE INVENTION

Disc drive data storage devices are well known in the industry. Such devices use rigid discs coated with a magnetizable medium for storage of digital information on a plurality of circular concentric data tracks. The information is written to and read from the discs using a transducing head mounted on an actuator mechanism which moves the head from track to track across a surface of the disc under the control of electronic circuitry. The disc or discs are mounted for rotation on a spindle motor which causes the disc to spin at a very high, constant speed and the surfaces of the discs to pass under the heads.

As magnetic storage densities have increased, magnetic disc drives have been required to operate with increasingly greater precision. This requirement has meant that magnetic recording heads have been placed increasingly close to the surface of the magnetic disc. The interaction between the magnetic head and the recording surface has also become increasingly precise. This requires the environment of the magnetic disc to be free from particulate and liquid contaminants which could interfere with this interface between the magnetic head and the recording surface. Typically, the disc environment is sealed during manufacture so that contaminants cannot enter the housing and contact the storage disc or the magnetic recording head. Additionally, it is important that the disc environment within the housing remain contaminant free following manufacturing and throughout the life of the disc drive system. Even micro minute contaminants can have serious results on disc operation. For example, particulate build-up between the transducing head and the disc can cause degradation in the readback signal, head crashes, and damage to the disc surface.

One source of particulate and liquid contaminants in the sealed chassis is the disc drive spindle motor which is located within the housing and supports and rotates the storage disc. The disc rotates at speeds in excess of several thousands of rpm, and the rotational speed in present day disc drives continues to increase. Although efforts are made to seal the motor, the seal is not perfect and especially at high rotational speed, contaminants tend to be generated and escape from the motor into the compartment containing the disc.

In such disc drive spindle motors, it is well known that the liquid or gas in a hydrodynamic bearing or the lubricants in a ball bearing when operated under high speed, high temperature conditions may result in outgassing. Volatile components from the spindle bearing lubricants come out, and come in contact with the relatively cooler disc surface. This phenomenon creates micro droplets, causing HDI failure. With the increasing trend to higher spindle motor speeds, the existence of this phenomenon has made it more challenging to design durable disc drives.

The outgas depends on many factors, including the opening of the meniscus or menisci in the hydrodynamic bearing, the opening of the ball bearing seal or shield, as well as the operating temperature, and the properties of the lubricant (liquid or gas) which support rotation of the bearing.

Several methods have been applied in the prior art to reduce outgassing. One common method is by incorporating a fertofluidic seal. A ferrofluidic seal is efficient at reducing the outgassing, but it brings a new problem by degrading and outgassing itself, especially at high rpm and temperature. The seal is also very expensive. An example of such a ferrofluid seal is found in U.S. Pat. No. 5,011,165. As shown in this patent, the ferrofluid seal is a fluidic seal, the fluid being held in place by a magnet. The fluid extends across a gap between a fixed portion of the disc drive motor and a rotating portion of the motor, and thereby prevents contaminants from the motor from entering the sealed disc environment defined by the housing. However, as discussed above, the ferrofluid itself may leak from the seal or may outgas and enter the disc environment. Further, especially under high temperature and high rotational speed conditions, the ferrofluid seal may leak into the motor causing damage. Additionally, any leakage of the ferrofluid or other loss of the quantity or quality of the fluid over time reduces the effective quantity of the ferrofluid defining the seal, thereby reducing the effectiveness of the seal.

Another type of seal is a labyrinth seal. Typically, a labyrinth seal is defined by a small gap between a rotating portion and a stationary portion of the motor, the small gap extending over a long path between these two relatively rotating parts. The length and complexity of the path tends to inhibit contaminants from the motor from escaping through the labyrinth into the sealed disc compartment. The effectiveness of the labyrinth seal is dependent on minimization of the gap, and lengthening the path, and maintaining the complexity of the path. However, this requires precision machining which is difficult, time consuming and expensive. Although such seals tend to be less expensive than ferrofluid seals, they are also not as effective in isolating the motor from the disc environment.

Thus there is a continuing need for improving the isolation between the spindle motor and disc drive and the contaminant free disc housing.

SUMMARY OF THE INVENTION

The disc drive of the present invention includes a disc drive spindle motor and a chassis or housing for providing a substantially contaminant free cavity for housing one or more discs supported on the spindle motor. The disc drive spindle motor includes a fixed member coupled to the chassis, and a rotor rotatable about the fixed member for rotating a magnetic storage disc in the contaminant free cavity. A bearing, which may be a hydrodynamic bearing, ball bearing or other bearing type, interconnects the fixed member and the rotor, and supports the rotor for rotation relative to the fixed member. According to the present invention, a very simple seal termed herein a condensation seal is supported from either the fixed member or the rotor, adjacent the bearing opening where outgassing may occur. The seal is called a condensation seal as the condensing phenomena will be applied to reduce the outgassing.

The seal incorporates a cooling surface which is supported from either the hub/rotor or the fixed member adjacent the region where outgassing occurs; the surface preferably should be wavy, or fin shaped to provide a maximum surface area for better heat transfer and better cooling effect, so that the surface is relatively cooler than the surrounding operating environment. The surface is shaped and made of a material, e.g. aluminum, and of a thickness to optimize the heat transfer characteristics, so that the hot volatile products of the outgassing phenomenon will condense when they come in contact with the condensation seal surface. The condensation seal surface must have a specified clearance with the fixed member or rotor to avoid any possibility of contact, while maximizing the condensation efficiency by placing the cooling surface directly in the path of the outgassing phenomenon.

It is important to note that the cooling surface must not touch the lubricant of the bearing.

The principles of the invention, as will be described more fully below, can be applied to hydrodynamic bearings of either the thrust plate or conical or spherical, or combination design, or to ball bearings.

Other features and advantages of the present invention will become apparent to a person of skill in this art who studies the description given below of one or more alternative preferred embodiments of the present invention, given in association with the following drawings.

DETAILED DESCRIPTION OF THE PREFERRED EMBODIMENTS

Figure 1:
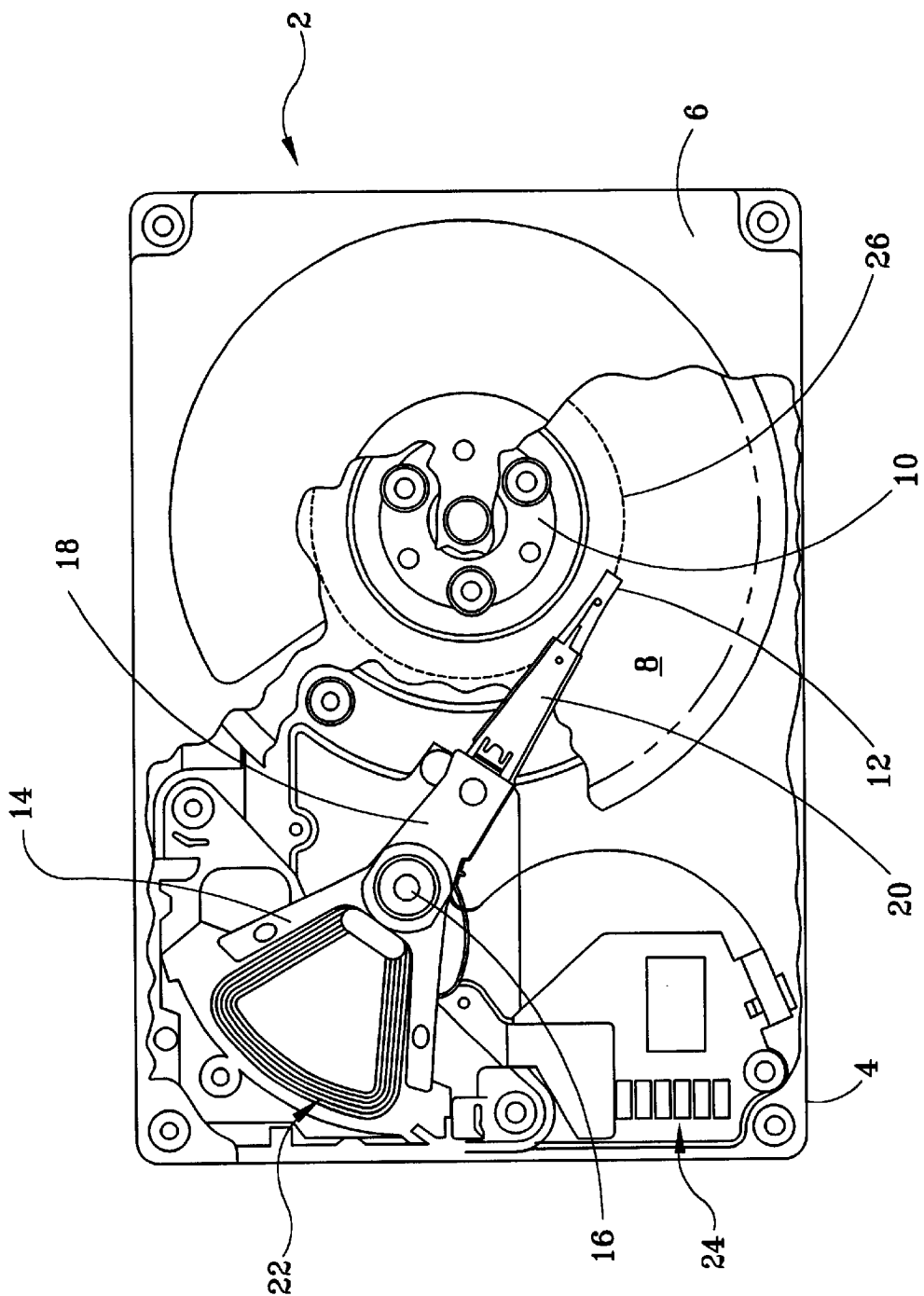
FIG. 1 is a plan view of a disc drive in which the present invention is useful.

FIG. 1 shows a plan view of a disc drive in which the present invention is useful. The disc drive 2 includes a base member 4 to which internal components of the unit are mounted. Base member 4 couples to top cover 6 which forms a sealed environment or cavity within the housing so established for critical parts of disc drive 2.

Disc drive 2 includes a plurality of discs 8 which are mounted for rotation on a spindle motor, generally indicated at 10. Motor 10 is described below in greater detail. A plurality of magnetic read-write heads 12, usually one per disc surface, are mounted to an actuator 14. In the example shown at drive 2, actuator 14 is a rotary actuator which is mounted for pivoting about a pivot axis 16. Actuator 14 includes one or more head mounting arms 18, each of which couples a head 12 to the actuator body via a plurality of load beam/gimbel assemblies 20. Actuator motor 22 is also coupled to actuator body 14 to provide a force to move heads 12 to a desired position on the surface of disc 8.

FIG. 2 shows a spindle motor 40 with ball bearing support of the hub illustrating in cross section two embodiments of the invention on either side of the fixed shaft. It is of course apparent that the present invention is equally useful with rotary shaft motors.

In this example, the shaft 42 is supported from or otherwise affixed to base 44. The rotor hub generally indicated at 50 includes a hub or sleeve 52 which is mounted by ball bearings 54, 56 at near upper and lower ends of the shaft 42 for rotation about the shaft. The hub 52 supports one or more discs 8 for rotation which is driven by a motor which includes the stator 60 which is supported from the base 44 and magnet 62 which is supported adjacent the stator 60 from the hub 52; the magnet may be directly attached to backiron 53 which in turn is supported from hub 52. Electrical signals supplied to the windings 64 of the stator assembly 60 create a magnetic field which interacts with the permanent magnets 62 to cause the hub 52 and its discs 8 to rotate.

Although the disc 8 is contained in a sealed, contaminant free cavity 60, formed by the base 4 and cover 6 as described above, with respect to FIG. 1, various contaminants from the motor such as metal particles or lubrication used with the bearings 54, 56 tend to leak from the bearing cavity 55 between sleeve 52 and shaft 42 and enter the contaminant free cavity 60 along the air flow path which is defined at the end of the bearing cavity 55. The present invention provides a condensation seal which captures the particles and contaminants created by this outgassing phenomenon so that they do not reach the sealed environment 60 and cannot condense on the surface of any of the discs 8.

According to the invention, a condensation cover is provided which defines an extra surface which is slightly away from the ball bearing in a ball bearing supported system or the meniscus or other seal which defines the end of the fluid in a fluid dynamic bearing so that, in either case, the condensation cover is not in touch with the oil, fluid or other lubricant. As shown in the figure, the condensation cover 102a (right side of FIG. 2) may be either integrated with the disc clamp 104 which is secured to the rotating hub 62 in a well-known manner so that the cover 102a is separated from the sleeve by a small gap 106; or alternatively, the cover 102b may be supported directly from the stationary shaft 42 and separated from the rotating hub 52 by a small gap 108. In either case, whether the condensation cover 102 is stationary or rotational, it is preferably wavy or fin-shaped as shown in FIG. 2B. Because this condensation cover presents a substantial exposed surface to the atmosphere of the housing, and is either rapidly rotating through the housing as is the case with the cover 102a which is mounted to the disc clamp, or because it is fairly close to the spinning hub 52 while the cover 102 itself remains stationary, in either event the cover will be substantially cooler than any airflow exiting the bearing gap. Thus, as the outgassed lubricants come in contact with the relatively cooler surface, and condense in the form of microdroplets over the surface of the condensation cover because of its substantially lower temperature, these microdroplets trap the outgassing products.

Figure 2A:
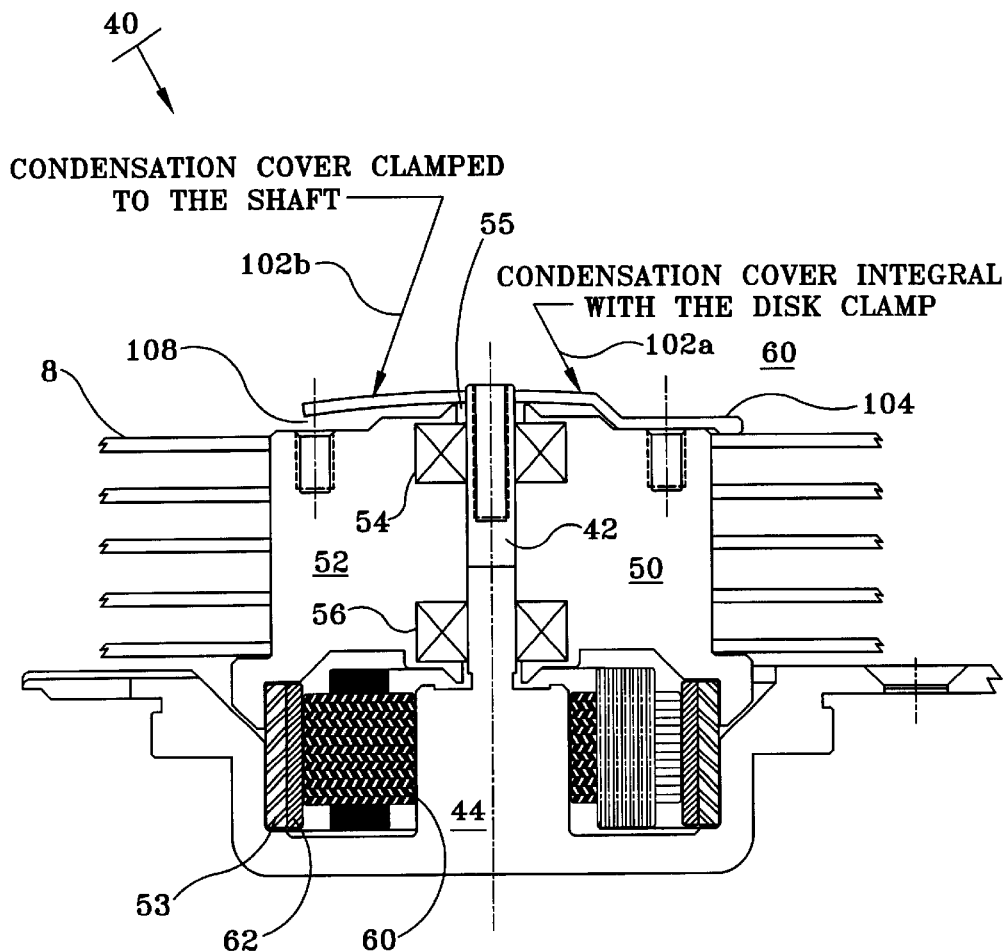
FIG. 2A is a vertical sectional view of a fixed shaft motor incorporating two embodiments of this invention used with ball bearings.
Figure 2B:
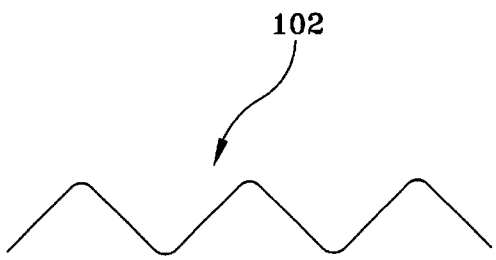
FIG. 2B is an enlarged view of a section of the condensation cover.
Figures 3A, 3B:
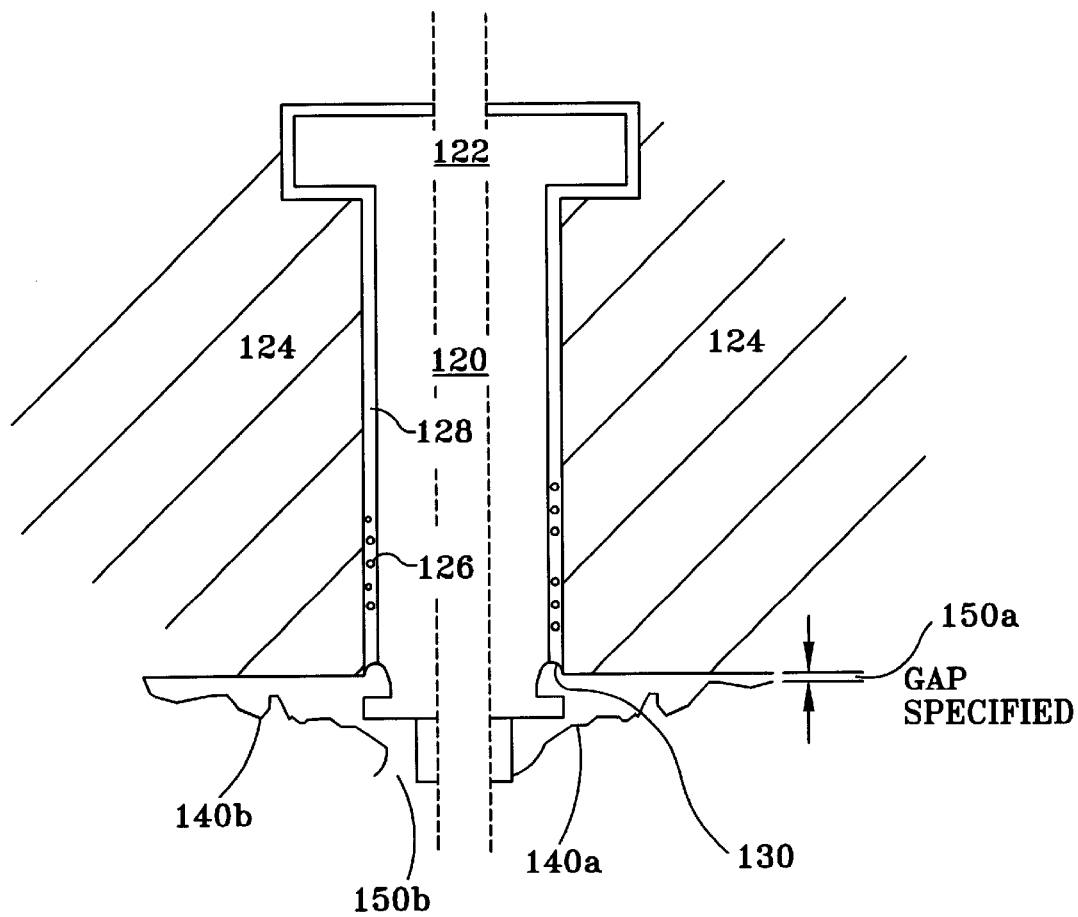
FIGS. 3A and 3B are partial vertical section views of two embodiments of the invention used with a hydrodynamic thrust bearing.

FIGS. 2A and 2B have described the present invention showing a motor and hub supported for relative rotation by ball bearings. FIGS. 3A and 3B show two configurations of fluid dynamic bearings incorporating the same invention. Thus FIG. 3A shows a fixed shaft 120 supporting a thrust plate 122 with a surrounding sleeve 124 supported for rotation by fluid 126 in gap 128 between the sleeve 124 and shaft/thrust plate 120,122 combination. The fluid ends at a meniscus 130. To prevent possible fluid loss, the condensation seal surface 140 is mounted either from the sleeve 124 as shown by surface 140b, or mounted from the shaft 120 as shown by surface 140a. In either event, a small gap 150a,b is provided so that relative rotation between the shaft and sleeve without mechanical interference can be achieved, and the condensation surface does not come in contact with although it is located near to the fluid. Any outgassing products must flow over the surface of the condensation seal before exiting the gap, causing as described above the desired condensation on the surface which will entrap the outgassed products.

Figure 4:
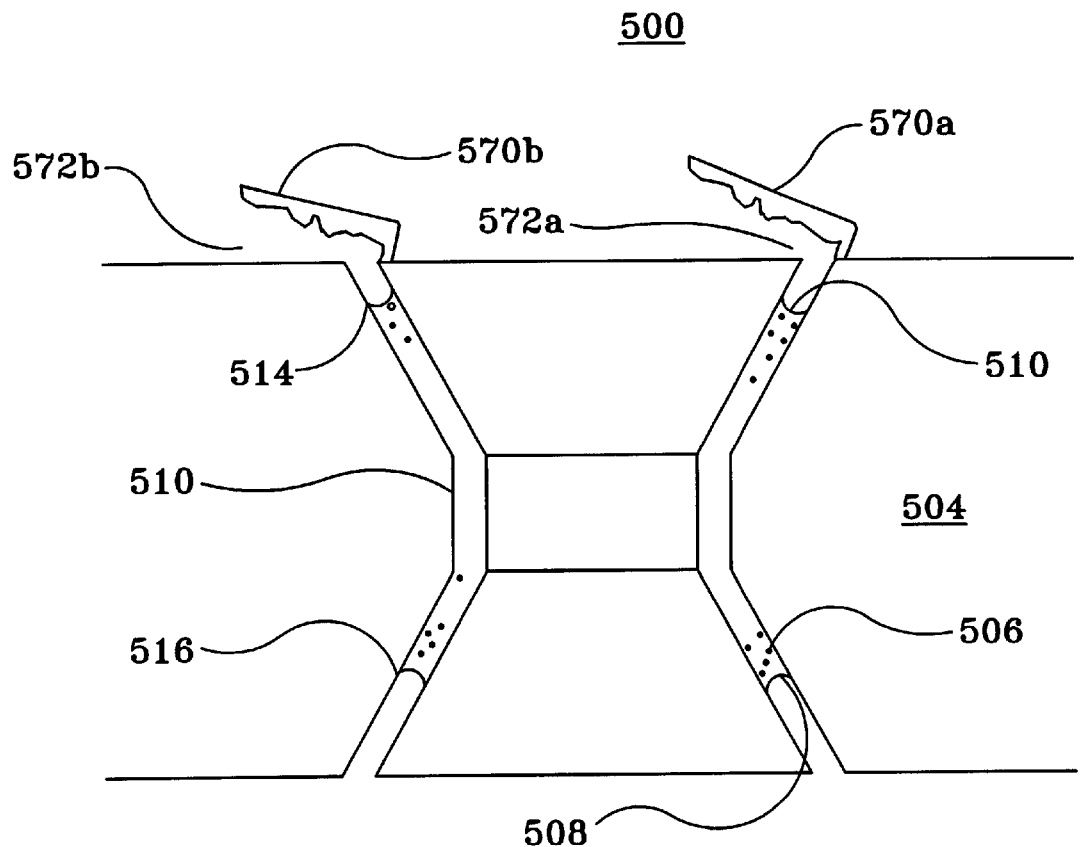
FIG. 4 is a vertical sectional view of the invention used with a conical bearing.

A similar phenomenon is achieved in FIG. 4 where the shaft supports a conical bearing 500 surrounded by a sleeve 504 with fluid 506 ending in a meniscus 508,510 at each end again providing the necessary support for relative rotation. The condensation plate or surface 570a,b is again mounted, defining a small gap 572a,b where the condensation products will collect.

In summary, to be successful, the condensation surface must not touch the lubricant directly, and has the following characteristics:

the surface should be wavy or fin-shaped to have maximum surface area for better heat transfer and better cooling effect; the surface can be either stationary or rotational as shown in FIGS. 2 and 3, but is preferably rotational to provide optimum cooling of the surface as it rotates;

the material choice and thickness should provide optimum heat transfer characteristics;

and the condensation seal surface must have a specified clearance with the shaft or hub to avoid any contact, but maximization of the condensation efficiency.

Other features and advantages of this invention may occur to a person of skill in the art who studies this invention disclosure. Therefore, the scope of the invention is to be limited only by the following claims.

What is claimed is:

1. A disc drive comprising a housing providing a substantially contaminant free cavity and having a spindle motor therein comprising:

a central axis, a stationary member which is fixed with respect to the housing and coaxial with the central axis, a rotatable member which is rotatable about the central axis with respect to the stationary member, at least one data storage disc carried by the rotatable member within the contaminant free cavity, a bearing interconnecting the stationary member and the rotatable member and supporting the rotatable member for rotation about the stationary member, a flow path from the bearing to the contaminant free cavity and a condensation cover interposed in and adjacent to the air path from the bearing to the contaminant free cavity and a condensation cover interposed in the air flow path between the bearing and the contaminant free cavity and out of touch with any lubricant in the bearing to capture outgass products from the lubricant.

2. A disc drive as claimed in claim 1 wherein the condensation cover is clamped to the shaft and extends substantially radially over the hub and defines a gap with the hub to maintain an open flow path from the bearing to the contaminant free cavity.

3. A disc drive as claimed in claim 1 wherein the condensation cover is fixed to the hub and rotates with the hub, the condensation cover extending radially over the surface of the hub.

4. A disc drive as claimed in claim 3 wherein the condensation cover is integrated with a disc clamp, the cover extending radially beyond an edge of the hub and contacting a disc supported by the hub, the condensation cover being spaced from a shaft supported on the central axis so that the flow path is maintained.

5. A disc drive as claimed in claim 2 wherein the condensation cover has at least one wavy surface facing the flow path, to provide a maximum surface area for better heat transfer and cooling effect.

6. A disc drive as claimed in claim 3 wherein the condensation cover has at least one wavy surface facing the flow path, to provide a maximum surface area for better heat transfer and cooling effect.

7. A spindle motor comprising:

a central axis, a stationary member which is fixed with respect to the housing and coaxial with the central axis, a rotatable member which is rotatable about the central axis with respect to the stationary member, at last one data storage disc carried by the rotatable member within the contaminant free cavity, a bearing interconnecting the stationary member and the rotatable member and supporting the rotatable member for rotation about the stationary member, a flow path from the bearing to the contaminant free cavity, and a condensation cover interposed in and adjacent to the air path from the bearing to the contaminant free cavity and a condensation cover interposed in the air flow path between the bearing and the contaminant free cavity and out of touch with any lubricant to the bearing to capture outgass products from the lubricant.

8. A disc drive as claimed in claim 7 wherein the condensation cover is clamped to the shaft and extends substantially radially over the hub and defines a gap with the hub to maintain an open flow path from the bearing to the contaminant free cavity.

9. A disc drive as claimed in claim 7 wherein the condensation cover is fixed to the hub and rotates with the hub, the condensation cover extending radially over the surface of the hub.

10. A disc drive as claimed in claim 9 wherein the condensation cover is integrated with a disc clamp, the cover extending radially beyond an edge of the hub and contacting a disc supported by the hub, the condensation cover being spaced from a shaft supported on the central axis so that the flow path is maintained.

11. A disc drive as claimed in claim 8 wherein the condensation cover has at least one wavy surface facing the flow path, to provide a maximum surface area for better heat transfer and cooling effect.

12. A disc drive as claimed in claim 9 wherein the condensation cover has at least one wavy surface facing the flow path, to provide a maximum surface area for better heat transfer and cooling effect.

13. A disc drive spindle comprising a housing providing a substantially contaminant free cavity and having a spindle motor therein comprising:

a central axis, a stationary member which is fixed with respect to the housing and coaxial with the central axis, a rotatable member which is rotatable about the central axis with respect to the stationary member, at least one data storage disc carried by the rotatable member within the contaminant free cavity, a bearing interconnecting the stationary member and the rotatable member and supporting the rotatable member for rotation about the stationary member, a flow path from the bearing to the contaminant free cavity, and a condensation means interposed in the path from the bearing to the contaminant free cavity and out of touch with any lubricant in the bearing to capture outgas products from the lubricant.

14. A disc drive as claimed in claim 13 wherein the condensation means is supported from the shaft and extends to maintain an open flow path from the bearing to the contaminant free cavity.

15. A disc drive as claimed in claim 13 wherein the condensation means is fixed to the hub and rotates with the hub.

* * * * *

UNITED STATES PATENT AND TRADEMARK OFFICE
CERTIFICATE OF CORRECTION

| | | |
|---|---|---|
| PATENT NO. | : 6,421,201 B1 | Page 1 of 1 |
| DATED | : July 16, 2002 | |
| INVENTOR(S) | : Khan, Raquib Uddin, Shumway, Matt Loren and Fan, Susan Feng | |

It is certified that error appears in the above-identified patent and that said Letters Patent is hereby corrected as shown below:

<u>Title page, Item [54] and Column 1, lines 1-3,</u>
Correct the title as follows: -- OUTGASSING REDUCTION OF LUBRICANTS FROM SPINDLE MOTOR BY UTILIZING A CONDENSATION SEAL --

Signed and Sealed this

Twenty-sixth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,421,201 B1  Page 1 of 1
DATED : July 16, 2002
INVENTOR(S) : Raquib Uddin Khan; Matt Loren Shumway and Susan Fang Fan It is certified that error appears in the above-identified patent and that said Letters Patent is hereby corrected as shown below:

<u>Title page,</u>
Please insert the assignee to read as follows:

-- [73] Assignee: Seagate Technology LLC --

Signed and Sealed this

Thirteenth Day of May, 2003

JAMES E. ROGAN
*Director of the United States Patent and Trademark Office*